H. J. ZIMMERMANN.
ATOMIZING NOZZLE.
APPLICATION FILED JUNE 15, 1918.

1,363,703.

Patented Dec. 28, 1920.
2 SHEETS—SHEET 1.

Inventor:
Hans J. Zimmermann,
By Dyrenforth Lee, Chritton & Wiles
Att'ys

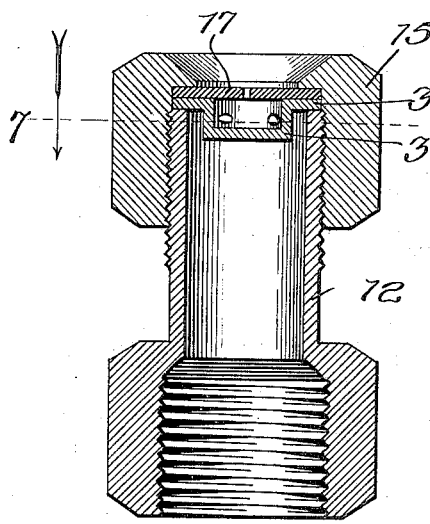
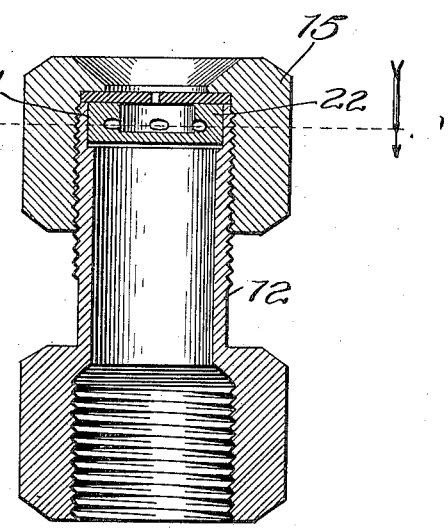
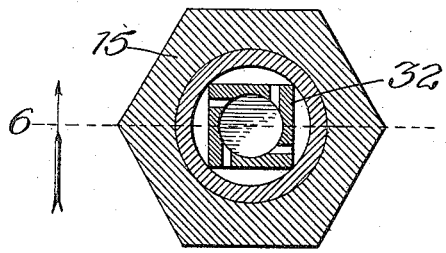
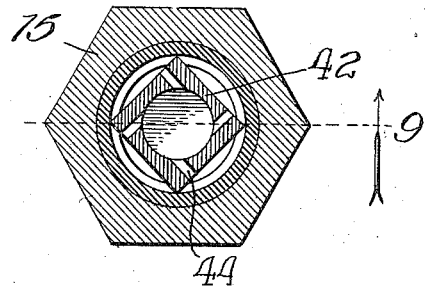
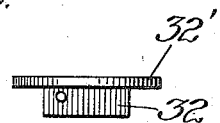
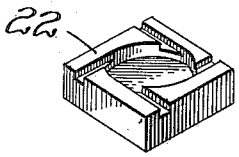

United States Patent Office.

HANS J. ZIMMERMANN, OF CHICAGO, ILLINOIS, ASSIGNOR, BY MESNE ASSIGNMENTS, TO THE G. A. BUHL COMPANY, OF CHICAGO, ILLINOIS, A CORPORATION OF ILLINOIS.

ATOMIZING-NOZZLE.

1,363,703.        Specification of Letters Patent.     Patented Dec. 28, 1920.

Application filed June 15, 1918. Serial No. 240,262.

*To all whom it may concern:*

Be it known that I, HANS JOSEPH ZIMMERMANN, a citizen of the United States, residing at Chicago, in the county of Cook and State of Illinois, have invented a new and useful Improvement in Atomizing-Nozzles, of which the following is a specification.

My invention relates to improvements in atomizing nozzles and will be fully understood from the following specification taken in connection with the accompanying drawings.

Figure 1:
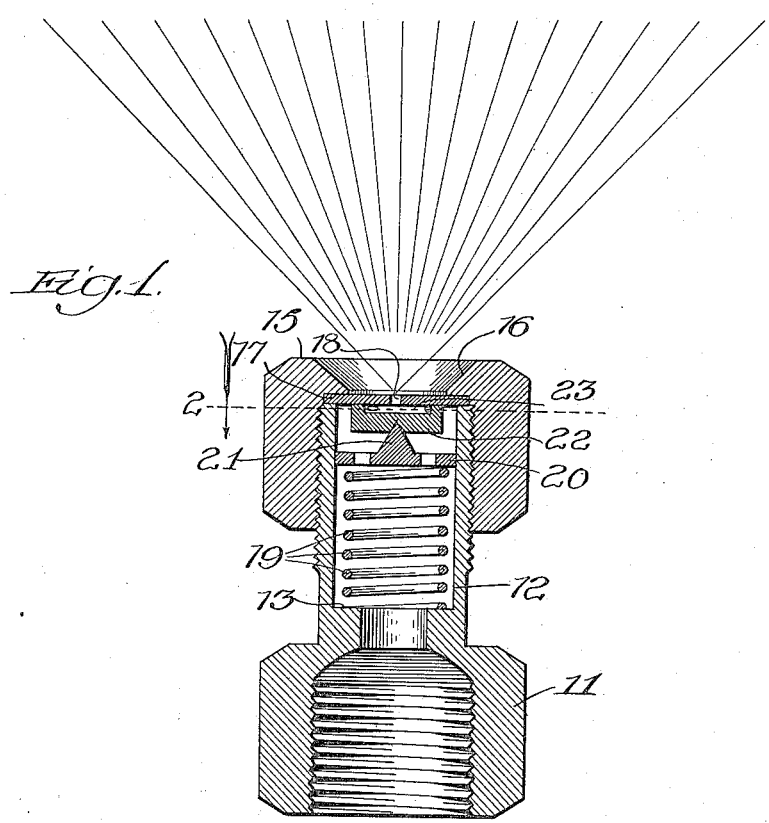
Figure 3:
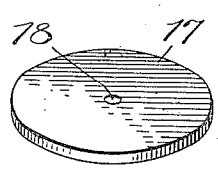
Figure 2:
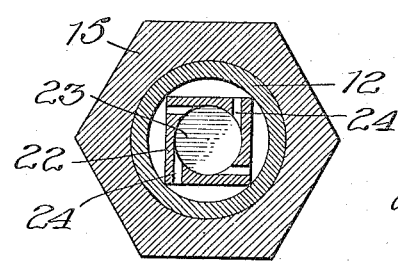
Figure 4:
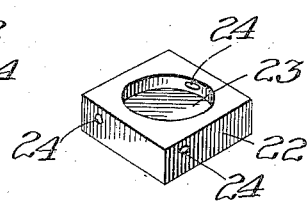
Figure 5:
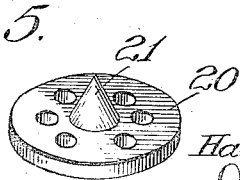

In these drawings Figure 1 is an enlarged central longitudinal section through one form of atomizing nozzle constructed in accordance with the invention. Fig. 2 is a transverse section on the line 2 of Fig. 1. Fig. 3 is a perspective view of the perforated disk forming the nozzle opening. Fig. 4 is a perspective view of the device employed for producing the spray. Fig. 5 is a perspective view of the cone-bearing washer. Fig. 6 is a longitudinal central section through a modified form of spray nozzle in accordance with the invention. Fig. 7 is a section on the line 7 of Fig. 6. Fig. 8 is a side elevation of the modified device for producing the spray. Fig. 9 is a longitudinal central section through a third form of atomizing nozzle; Fig 10 is a section on the line 10 of Fig. 9, and Fig. 11 is a perspective view of the spray-producing device of Fig. 9.

Referring more particularly to the drawings, the numeral 11 designates the body of the nozzle, this body having a hexagonal lower enlargement surrounding the internally threaded portion which screws over the nozzle feed-pipe. The upper portion of the nozzle as illustrated has a plane cylindrical bore 12 which terminates at the shoulder 13 and is threaded externally to receive a nozzle cap-nut 15, also conveniently of hexagon form and having a relatively large aperture with flaring walls 16 in its head. The cap-nut 15 secures in place against the upper end of the nozzle body a disk 17 having a single central perforation 18 which serves as the nozzle aperture.

Lying within the cylindrical bore 12 of the nozzle there is a helical compression spring 19 which seats at its lower end against the shoulder 13 and at its upper end bears against a perforated washer 20 which carries a cone-bearing point 21. This bearing point engages a recess in the lower face of a square block 22 which is preferably of such size that its diagonal is equal to the diameter of the bore 12, its outlines in cross-section thus constituting a square inscribed within the circle of the bore, as shown in Fig. 2. In the upper surface of the block 22 there is formed a cavity 23 which is circular in cross-section. This cavity is in communication with the bore of the nozzle by a plurality of tangential inlets 24 which may be conveniently drilled in at right angles from the side faces of the block, as is shown.

In the assembled position of the parts as shown in Fig. 1, the disk 17 is held firmly and in liquid-tight engagement with the upper end face of the nozzle-body by the cap-nut 15, while the spring 19 acting through the washer 20 holds the upper flat face of the block 22 against the lower face of the disk 17. In the use of the nozzle the same will be supplied with liquid under a greater or less pressure, and this liquid passing up the bore 12 and into the spaces between the side faces of the block 22 and the wall of the bore will enter the cavity 23 tangentially at four points as illustrated, escaping from the center of the cavity through the aperture 18 in the disk. As a result of this tangential inflow and central outflow of liquid from the cylindrical cavity 23 the liquid issuing from the nozzle 18 forms a conical spray, as indicated in Fig. 1. Owing to the very small relative size of the nozzle aperture the angular velocity of the liquid which moves out helically through the nozzle aperture is exceedingly high with the resultant production of a fine divergent spray. In the use of the nozzle the pressure of the spring 19, which is primarily depended upon to maintain a liquid-tight joint between the abutting faces of the block 22 and the disk 17 is supplemented by the differential liquid pressure on the two faces of the block, it being evident that the pressure on the lower or outer face of the block will always exceed that of the inner face. This differential liquid pressure will, in general, be so high that if the abutting faces of the block and disk are finished with a moderate degree of care, the liquid leakage between these faces and constant disturbance of the angular movement of the liquid within the cavity 23 will be negligible.

It should be particularly noted with respect to the nozzle construction described that the nozzle aperture proper is formed in a separate disk which may be readily renewed without great expense. It may be noted also that the only possibility of leakage in the nozzle construction illustrated is at the surfaces between the disk 17 and the cap-nut on the outer face and the nozzle-body and screw-threads on the inner face. Owing to the great pressure which may be conveniently exerted upon these actual faces by turning down the cap-nut 15, it is not difficult to insure a tight joint at these points.

In Figs. 6, 7 and 8 I have illustrated a modified nozzle construction which is identical with that heretofore described, save in the construction of the sprayer block. This member, here designated 32, is shown as having a body portion identical with that of the block 22 but carrying in addition an integral circular flange $32^1$ of the same diameter as the disk 17 and adapted to be confined between the latter and the upper end of the nozzle body, as is shown in Fig. 6.

In the construction shown in Figs. 6 to 8, therefore, the liquid pressure or differential pressure is not relied upon even supplementarily for maintaining a liquid-tight joint between the block and the lower face of the disk, these parts being held firmly in engagement by the pressure of the cap-nut 15.

In Figs. 9 and 10 I have illustrated a further modification of the nozzle construction heretofore described, the nozzle body being here counter-bored at the upper end, as shown at 12, for a depth very slightly exceeding the depth of the block 22, the latter being identical with the block employed in Figs. 1 to 5, save as to size, it being obvious that in the construction shown in Figs. 9 and 10 the outline of the block should be inscribed within the counter-bore $12^1$ instead of within the main bore 12. In the construction shown in Figs. 9 and 10 the liquid pressure alone is relied upon to maintain the required seal between the opposed surfaces of the block and disk, the counter-bore $12^1$ being, as illustrated, of slightly greater depth than the block so that the latter is not positively held in engagement with the disk.

In Fig. 11 there is illustrated a modified construction of the block, designated 42, and in this modified construction the tangential liquid inlets are in the form of slots 44 cut in the upper face of the block. The nozzle constructions illustrated and describing the foregoing are designed to accomplish the effective atomization of liquids in the simplest manner, it being feasible to employ this type of construction not only with metal nozzles but with chemically resistant porcelain or silicious materials which are required for the spraying of acids, for example.

While I have shown and described in considerable detail some specific nozzle constructions in accordance with my invention, it will be understood that this is illustrative only and for the purpose of making the invention more clear, and that the invention is not to be regarded as limited to these details, nor to any of them, except in so far as they are included within the terms of the accompanying claims, in which it is my intention to claim all novelty inherent in the invention as broadly as is permissible in view of the prior art.

What I claim as new and desire to secure by Letters Patent is—

1. A nozzle comprising a body portion having a cylindrical bore, a closure-member for the said body having a nozzle-opening therein, a polygonal block abutting the inner face of the nozzle closure, the outlines of the polygonal cross-section of the block being inscribed within the circle of the bore, the said block having a central cavity in communication with the nozzle aperture and generally tangential inlets passing from the said cavity to the polygonal faces and there communicating with the bore of the nozzle.

2. A nozzle having a body portion, a nozzle closure fitted thereover and having a central nozzle orifice, a polygonal block, the cross-section of which is inscribed within the nozzle bore, the said block having a cavity therein in communication with the nozzle orifice, tangential inlets forming communication between the said cavity and the bore of the said nozzle, a spring lying within the bore of the nozzle and bearing upon the said block to hold the same in contact with the opposed face of the nozzle closure.

3. A nozzle having a body portion, a nozzle closure fitted thereover and having a central nozzle orifice, a polygonal block fitting within the nozzle bore, the said block having a cavity therein in communication with the nozzle orifice, tangential inlets forming communication between the said cavity and the bore of the nozzle, a perforated plate fitting within the nozzle bore and having a conical projection bearing against said block and a spring lying within the bore of the nozzle and bearing upon the said plate, thereby holding the block in contact with the face of the nozzle closure.

HANS J. ZIMMERMANN.